United States Patent
Thörn et al.

(10) Patent No.: US 9,024,973 B2
(45) Date of Patent: May 5, 2015

(54) METHOD AND ARRANGEMENT IN AN ELECTRONIC DEVICE

(75) Inventors: Karl Ola Thörn, Limhamn (SE); Per Åstrand, Lund (SE); Henrik Bengtsson, Lund (SE); Magnus Landqvist, Lund (SE); Linus Mårtensson, Lund (SE); Mats Wernersson, Helsingborg (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/820,272

(22) PCT Filed: Mar. 12, 2012

(86) PCT No.: PCT/EP2012/054195
§ 371 (c)(1),
(2), (4) Date: Jun. 10, 2013

(87) PCT Pub. No.: WO2013/135262
PCT Pub. Date: Sep. 19, 2013

(65) Prior Publication Data
US 2014/0160159 A1    Jun. 12, 2014

(51) Int. Cl.
*G09G 5/00* (2006.01)
*G06T 19/00* (2011.01)
*G06F 3/01* (2006.01)
*G02B 27/01* (2006.01)

(52) U.S. Cl.
CPC .............. *G06T 19/006* (2013.01); *G06F 3/011* (2013.01); *G02B 27/017* (2013.01); *G02B 2027/0178* (2013.01)

(58) Field of Classification Search
None
See application file for complete search history.

(56) References Cited

U.S. PATENT DOCUMENTS

| | | |
|---|---|---|
| 2006/0176242 A1 | 8/2006 | Jaramaz et al. |
| 2009/0153549 A1* | 6/2009 | Lynch et al. ................ 345/419 |
| 2011/0137156 A1* | 6/2011 | Razzaque et al. ............ 600/424 |
| 2011/0214082 A1 | 9/2011 | Osterhout et al. |
| 2013/0194259 A1* | 8/2013 | Bennett et al. ............... 345/420 |
| 2014/0146044 A1* | 5/2014 | Cvetko ........................ 345/420 |
| 2014/0219581 A1* | 8/2014 | Astrand et al. ............... 382/284 |

OTHER PUBLICATIONS

International Search Report and Written Opinion dated Dec. 6, 2012 issued in corresponding PCT application No. PCT/EP2012/054195, 13 pages.
Bane, Ryan et al.: "Interactive Tools for Virtual X-Ray Vision in Mobile Augmented Reality." Third IEEE and ACM International Symposium, Arlington, VA, USA, 2004.

* cited by examiner

*Primary Examiner* — James A Thompson
(74) *Attorney, Agent, or Firm* — Snyder, Clark, Lesch & Chung, LLP

(57) ABSTRACT

An object of the present invention is to provide a way of displaying content of an obscured area of a view for a user. The object is achieved by a method in an electronic device. The electronic device obtains (402) an information identifying a position of the obscured area in relation to the view. The electronic device further calculates (403) an information identifying the position of the obscured area on a display. The electronic device obtains (404) an information regarding the content of the view or part of the view when not obscured from a memory. The electronic device creates (405) an image relating to the content of the obscured area of the view. The electronic device further displays (406) the image on a place on the display that corresponds to the calculated (403) position of the obscured area in relation to the display.

9 Claims, 5 Drawing Sheets

METHOD AND ARRANGEMENT IN AN ELECTRONIC DEVICE

TECHNICAL FIELD

Embodiments herein relates generally to image processing in an electronic device and in particular to creating a semi-transparent viewing experience.

BACKGROUND

During the last years touch screens has been more and more popular in many devices such as mobile phones, tablets and computers. On a touch screen no regular keyboard is used, instead the user touches the screen to give input to the device. One problem with a touch screen is that the hand is held in front of the touch screen and occludes the touch screen. This makes it more difficult to read the text on the touch screen and also touch the touch screen in a more precise manner.

A related case is if a person writes on a white board. Sometimes it is difficult for a reader to read the text on the white board because the hand, arm and even the body of the writing person obscures what's written on the white board. The limbs of the person may also distract the readers.

A technology that also has been more popular during the last years is augmented reality. Augmented reality means that some information is displayed on a display improving the experience for the user. For example, a picture is recorded by a camera. When the picture is displayed on a display some information is added on the display. This information may e.g. be information regarding what can be seen on the display. If a picture is recorded of a house and the camera is connected to a GPS-recorder and a compass, the information that's added on the display may e.g. be who owns the house. This technique is well known in the prior art.

SUMMARY

It is therefore an object of embodiments herein to provide a way of displaying content of an obscured area of a view for a user.

In accordance with a first aspect of an embodiment, a method in an electronic device is provided. The content is displayed on a display comprised in the electronic device. The display is adapted to be located between an eye of the user and the view. The electronic device further comprises a memory connected to a camera, The camera is arranged on the electronic device. The electronic device obtains an information identifying a position of the obscured area in relation to the view. The electronic device further calculates an information identifying the position of the obscured area on the display, based on the obtained information identifying the position of the obscured area in relation to the view. The electronic device obtains an information regarding the content of the view or part of the view when not obscured from the memory. The information regarding the content of the view was recorded by the camera and saved on the memory before the view was obscured. The electronic device further creates an image relating to the content of the obscured area of the view based on the obtained information identifying the position of the obscured area in relation to the display, based on the calculated information identifying a position of the obscured area in relation to the view, and based on the obtained information regarding the content of the view or part of the view when not obscured. The electronic device further displays the image on a place on the display that corresponds to the calculated position of the obscured area in relation to the display.

In accordance with a second aspect of an embodiment, an electronic device is provided. The electronic device has a display for displaying content of an obscured area of a view of a user of the electronic device. The content is displayed on a display comprised in the electronic device. The display is adapted to be located between an eye of the user and the view. The electronic device further comprises a memory connected to a camera. The camera is arranged on the electronic device. The electronic device comprises an obtaining circuitry configured to obtain an information identifying a position of the obscured area in relation to the view. The electronic device also comprises a calculating circuitry configured to calculate an information identifying the position of the obscured area on the display, based on the obtained information identifying the position of the obscured area in relation to the view. The obtaining circuitry is further configured to obtain an information regarding the content of the view or part of the view when not obscured from the memory. The information regarding the content of the view was recorded by the camera and saved on the memory before the view was obscured. The electronic device further comprises a creating circuitry configured to create an image relating to the content of the obscured area of the view based on the obtained information identifying the position of the obscured area in relation to the display and based on the calculated information identifying a position of the obscured area in relation to the view, and the obtained information regarding the content of the view or part of the view when not obscured. The electronic device further comprises a displaying circuitry configured to display the image on a place on the display that corresponds to the calculated position of the obscured area in relation to the display.

Since the electronic device identifies an area obscured by an object and that the corresponding area on the display is replaced with obtained information about the obscured area of the view, a semitransparent viewing experience is provided.

An advantage with embodiments herein is that it enables the user of the electronic device to see things behind the obscuring object.

A further advantage with embodiments herein is that the user of the electronic device is not distracted by the objects when watching the view.

BRIEF DESCRIPTION OF THE DRAWINGS

Examples of embodiments herein are described in more detail with reference to attached drawings in which.

DETAILED DESCRIPTION

Embodiments will be exemplified in a non-limiting description.

Figure 1:
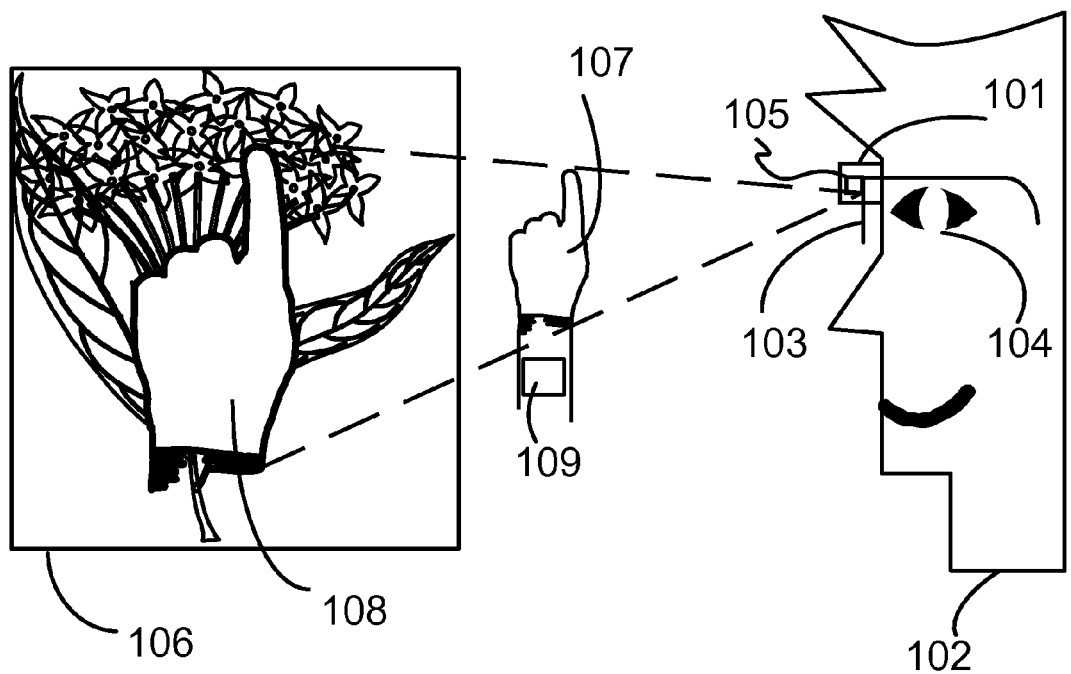
FIG. 1 is a schematic block diagram illustrating a scenario according to embodiments herein.

FIG. 1 illustrates a scenario according to some embodiments. The scenario comprises an electronic device 101. The electronic device 101 may be referred to as an augmented reality unit. The electronic device 101 may e.g. be placed at the head of a user 102.

The electronic device 101 comprises a display 103. The electronic device 101 uses an augmented reality technology that displays information on the display 103 to improve the experience for a user of the electronic device 101. For example, a picture is recorded by a camera. When the picture is displayed on the display 103 some information is added on the display 103. This information may e.g. be information regarding what can be seen on the display 103. If a picture is recorded of a house and the camera is connected to a GPS-recorder and a compass, the information that is added on the display may e.g. be to about which person who owns the house. The display 103 may be comprised in the electronic device 101, or be a separate unit connected to the electronic device 101. The display 103 may be placed in front of one or both eyes 104 of the user 102. The display 103 may further be semitransparent so that the user can look through the display 103, but the display 103 may also be non-transparent. The display 103 may e.g. be worn by the user 102 like eye glasses as illustrated in FIG. 1. The display 103 may also be held in the hand of the user 102.

The electronic device 101 may comprise a camera 105. The camera 105 may be a video camera or a still picture camera. The camera 105 may be comprised in the electronic device 101, or be a separate unit connected to the electronic device 101. The camera 105 may be a video camera or a still picture camera. The purpose of the camera 105 is to record what's in front of the user 102 of the electronic device 101. The camera 105 is adapted to transfer information about what the camera 105 has recorded to the electronic device 101. The camera 105 is further adapted to save information about what the camera 105 has recorded to a memory, not shown in FIG. 1, but in FIG. 2. The memory may be placed in the camera 105, or in the electronic device 101, or may be a separate unit connected to the camera 105 and/or the electronic device 101. The camera 105 may have a wide angle view, such as a fish eye camera.

The scenario further comprises a view 106. The view 106 is located in front of the display 103. The view 106 may e.g. be a touch screen, the windshield of a car, a whiteboard or anything that's in the field of view of the user 102. The view 106 may be seen by the user 102 when looking through the display 103.

Between the view 106 and the user 102 of the electronic device 101 an object 107 may be placed. The object 107 may e.g. be a hand or a limb of the user 102. When the object 107 is placed between the view 106 and the user 102 of the electronic device 101, the object 107 obscures a part of the view 106 such that this part of the view is not visible by the user 102 and will be referred to as an obscured area 108.

The scenario may comprise a sensor 109 arranged on the object 107 obscuring the view 106. The sensor 109 may be connected to the electronic device 101 and is adapted to provide information to the electronic device 101 about the object 107 obscuring the view 106. The sensor 109 may e.g. be a gyro, a compass or a GPS receiver e.g. placed on the hand of the user 102.

Figure 2:
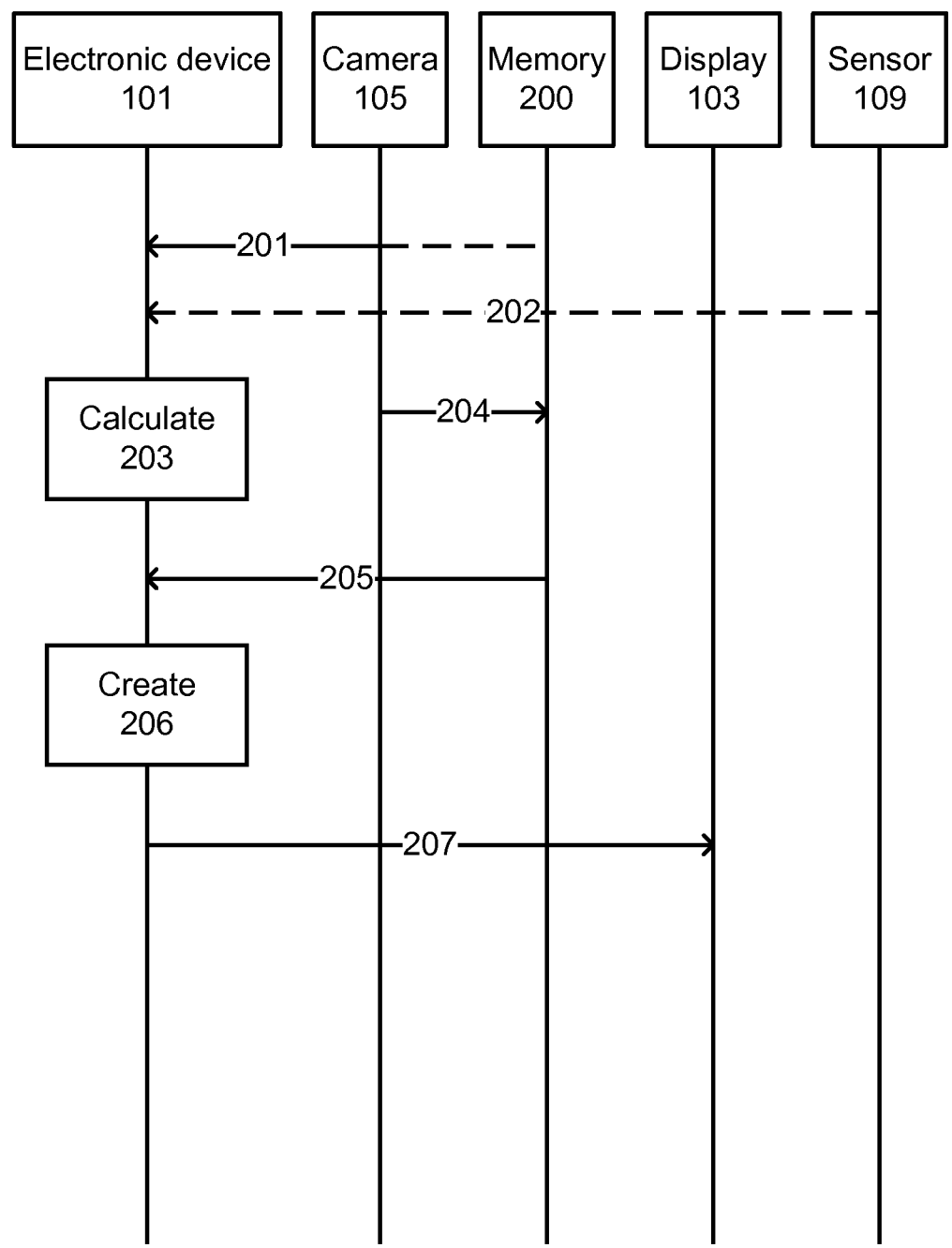
FIG. 2 is a schematic signaling and flow chart according to embodiments herein.

Embodiments of a method for displaying a content of the obscured area 108 of the view 106 will now be described with reference to a combined flow chart and signaling diagram in FIG. 2. To explain the embodiments herein the description below will be described with the following example. In this example the object 107 is the hand of the user 102 and the view 106 is a keyboard which the user 102 is typing on. Assume that the user 102 watches the view 106 that unfortunately is obscured by the object 107 e.g. the user 102 types on a touch screen using his hands which typing hands unfortunately obscures the touch screen. The user 102 is not able to see the keyboard of the touch screen since it is obscured by the typing hands. The user 102 now uses the electronic device 101 using an augmented reality function to make the hand semitransparent when looking through the display 103 of the electronic device 101. When the user 102 sees his hands as semitransparent the user 102 is able to see both the hands and the keyboard of the touch screen.

In the following description in relation to FIG. 2, the electronic device 101, the camera 105, the memory 200 and the display 103 will be described as separate units. It is understood by the person skilled in the art that they all may be comprised in the electronic device.

The method comprises the following actions, which actions may be performed in any suitable order. The actions may also be combined.

The embodiments describes a method in an electronic device 101 for displaying content of an obscured area 108 of a view 106 of a user 102 of the electronic device 101. The content is displayed on a display 103 comprised in the electronic device 101. The display 103 is adapted to be located between an eye 104 of the user 102 and the view 106.

Action 201

The electronic device 101 obtains an information identifying a position of the obscured area 108 in relation to the view 106. The obtained information identifying a position of the obscured area 108 in relation to the view 106 may be obtained from the camera 105 or from the memory 200. In our example this action is performed so the electronic device 101 is able to identify the typing hands of the user 102 that obscures the view. The camera 105 may be adapted to detect the object 107 in the view 106 using any kind of computer vision. Different techniques for computer vision is known in prior art. One way for the camera 105 to detect the object 107 may be to use an automatically acquired variable-length Markov model to represent the high-level structure and temporal ordering of gestures. Continuous estimation of hand posture is handled by combining the model with annealed particle filtering.

The camera 105 transfers the information identifying the position of the obscured area 108 in relation to the view 106 to the electronic device.

The obtained 201 information identifying the position of the obscured area 108 in relation to the view 106 may comprise image data. In the image data an object 107 that obscures the view 106 may be identified by the electronic device 101.

This means that the object 107 that obscures the view 106 may be identified in the image data. The identification of the object 107 in the image data may be performed with any method known in the prior art. Just like an expected face geometry may be derived from a video feed of a face the same can be done for hands using e.g. skeletal based gesture recognition algorithms e.g. XTR3D. Computer vision is hard to use when recording anything but there are certain expectations about the input. That is that hands/arms will always be in the field of view of the camera 105. This will make it easier for the electronic device 101 to optimize the computer vision algorithm.

Action 202

In some embodiments the electronic device 101 obtains position information regarding the object 107, from a sensor 109 attached to an object 107 obscuring the view 106. If the object 107 obscuring the view 106, is the hand of the user 102 the sensor 109 may e.g. be a compass, a gyro or a GPS receiver. The sensor 109 may be connected to the electronic device 101 via a cable or any kind of wireless connection. The sensor 109 is adapted to send the position information regarding the object 107 to the electronic device 101. This will help the electronic device 101 identifying the obscured area 108 in relation to the view 106. In our example the sensor 109 may be worn on the wrist or on the fingers of the user.

Action 203

The electronic device 101 calculates an information identifying the position of the obscured area 108 on the display 103, based on the obtained 201 information identifying the position of the obscured area 108 in relation to the view 106.

The calculated position an information identifying the position of the obscured area 108 on the display 103 corresponds to the area on the display where the view 106 is obscured by the object 107 when seen from the eye 104 of the user 102. The rest of the view 106 may still be visible on the display 103. If the display 103 is semitransparent, the position of the eye 104 of the user 102 must most likely be obtained to be able to calculate an information identifying the position of the obscured area 108 on the display 103 corresponding to the obscured area 108 of the view 106.

Action 204

The camera 105 records information regarding the content of the view 106 and transfers this information to a memory 200. The memory 200 receives the information regarding the content of the view 106 and saves it. The camera 105 may be the same camera 105 as obtains the information identifying the position of the obscured area 108 in relation to the view 106 as described in relation to action 201.

Action 205

The electronic device 101 obtains an information regarding the content of the view 106 or part of the view 106 when not obscured from the memory 200. The memory 200 is connected to a camera 105. The camera 105 is arranged on the electronic device 101. As mentioned in action 203 the information regarding the content of the view 106 was recorded by the camera 105 and saved on the memory 200 before the view 106 was obscured by the object 107.

The camera 105 sees the same view 106 as the user 102 of the electronic device 101. It is assumed that the information regarding the content of the view 106 does not change between the time point when the view 106 was recorded and when it was obscured. In our example the user 102 types on a keyboard and the keyboard will not change appearance when the user 102 types on it.

Action 206

The electronic device 101 creates an image relating to the content of the obscured area 108 of the view 106 based on the obtained 201 information identifying the position of the obscured area in relation to the display 103 and based on the calculated 203 information identifying the position of the obscured area 108 in relation to the view 106, and based on the obtained 205 information regarding the content of the view 106 or part of the view 106 when not obscured.

One way to create the image relating to the content of the obscured area 108 of the view 106 is to replace some pixels on the calculated 203 information identifying the position of the obscured area 108 on the display 103 with the corresponding pixels from the obtained 205 information regarding the content of the view 106. When creating the image it is possible to relight the calculated 203 position on the display 104 to better fit the use case e.g. dim down or grey out when the object 107 is not moving, increase contrast towards the view 106 or replace with an augmented reality hand. It is also possible to add virtual light sources and use these to relight the object 107 obscuring the view 106. With a depth map for the object 107 even shadows may be placed on the correct places. How to do this in detail is known in the prior art. The relight may be performed by observing the surface and the position of the object 107. Looking at the curvature of the surface of the object 107, they will have a specific shape that allows us to produce normals for each pixel in the image. These normals may in conjunction with 3D-position of the pixel be used to determine the brightness of pixels, depending on whether they are facing towards or away from the light sources.

Action 207

The electronic device 101 displays the image on a place on the display 103 that corresponds to the calculated 203 position of the obscured area 108 in relation to the display 103.

Figure 3:
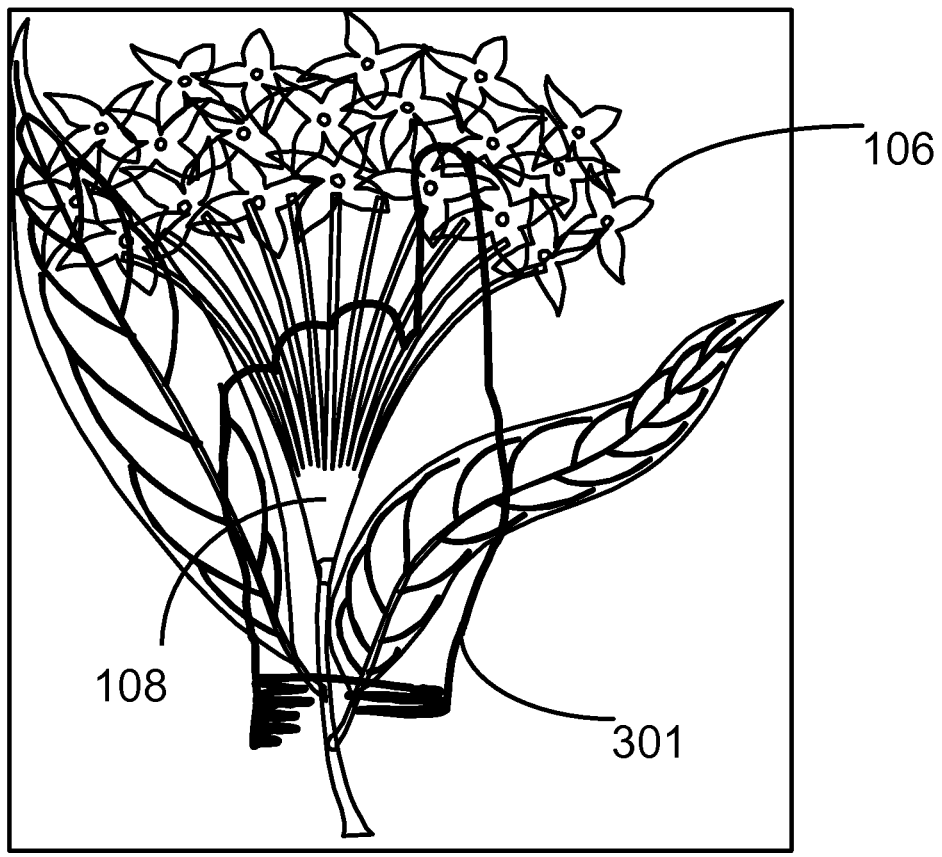
FIG. 3 is a schematic block diagram illustrating embodiments herein.

The effect of the embodiments described herein may be seen in FIG. 3. The aim of the embodiments presented herein is to display at least part of the content of the obscured area 108 to the user 102 of the electronic device 101. FIG. 3 is a schematic block diagram illustrating a semitransparent viewing experience according to embodiments. The electronic device 101 is able to show at least part of the obscured area 108 on the corresponding calculated 203 position on the display 103. When the user 102 looks at an object 107 such as a hand 301, parts of the obscured area 108 is visible on the display 103 giving the semitransparent viewing experience for the user 102.

If the electronic device 101 and the display 103 are separate units, the electronic device 101 transfers the image to the display 103 and the display 103 displays it. In our example the keyboard the user 102 is typing on will be displayed above the typing fingers. This gives a semitransparent viewing experience for the user.

Figure 4:
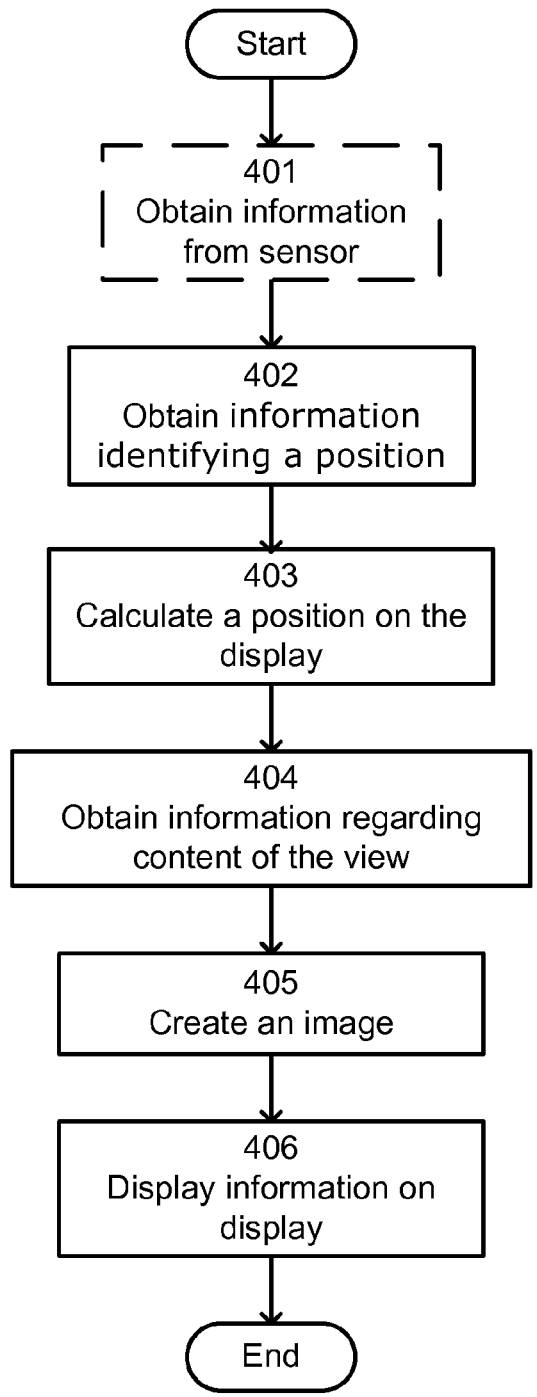
FIG. 4 is a flowchart depicting embodiments of a method in an electronic device.

Embodiments of a method in the electronic device 101 for displaying content of the obscured area 108 of the view 106 to the user 102 of the electronic device 101 will now be described with reference to a flow chart depicted in FIG. 4. FIG. 4 will be described from the perspective of the electronic device 101. The content is displayed on the display 103 comprised in the electronic device 101. The display 103 is adapted to be located between the eye 104 of the user 102 and the view 106. The method comprises the following actions, which actions may be carried out in any other suitable order than described below. Actions may also be combined.

Action 401

The electronic device 101 obtains position information regarding the object 107 from a sensor 109 attached to the object 107 obscuring the view 106. This action corresponds to action 202 in the description relating to the signaling diagram in FIG. 2.

Action 402

The electronic device 101 obtains information identifying the position of the obscured area 108 in relation to the view 106. This action corresponds to action 201 in the description relating to the signaling diagram in FIG. 2.

Action 403

The electronic device 101 calculates information identifying the position of the obscured area 108 on the display 103 based on the obtained 201, 402 information identifying the position of the obscured area 108 in relation to the view 106. This action corresponds to action 203 in the description relating to the signaling diagram in FIG. 2.

Action 404

The electronic device 101 obtains information regarding the content of the view 106 or part of the view 106 when not obscured from a memory 200. The memory 200 is connected to the camera 105. The camera 105 is arranged on the electronic device 101, wherein the information regarding the content of the view 106 was recorded by the camera 105 and saved on the memory 200 before the view 106 was obscured. This action corresponds to action 205 in the description relating to the signaling diagram in FIG. 2.

Action 405

The electronic device 101 creates an image relating to the content of the obscured area 108 of the view 106 based on the obtained 402 information identifying the position of the obscured area in relation to the display 103 and based on the calculated 403 information identifying a position of the obscured area 108 in relation to the view 106, and the obtained 404 information regarding the content of the view 106 or part of the view 106 when not obscured. This action corresponds to action 206 in the description relating to the signaling diagram in FIG. 2.

Action 406

The electronic device 101 displays the image on a place on the display 103 that corresponds to the calculated 403 position of the obscured area in relation to the display 103. This action corresponds to action 207 in the description relating to the signaling diagram in FIG. 2.

Figure 5:
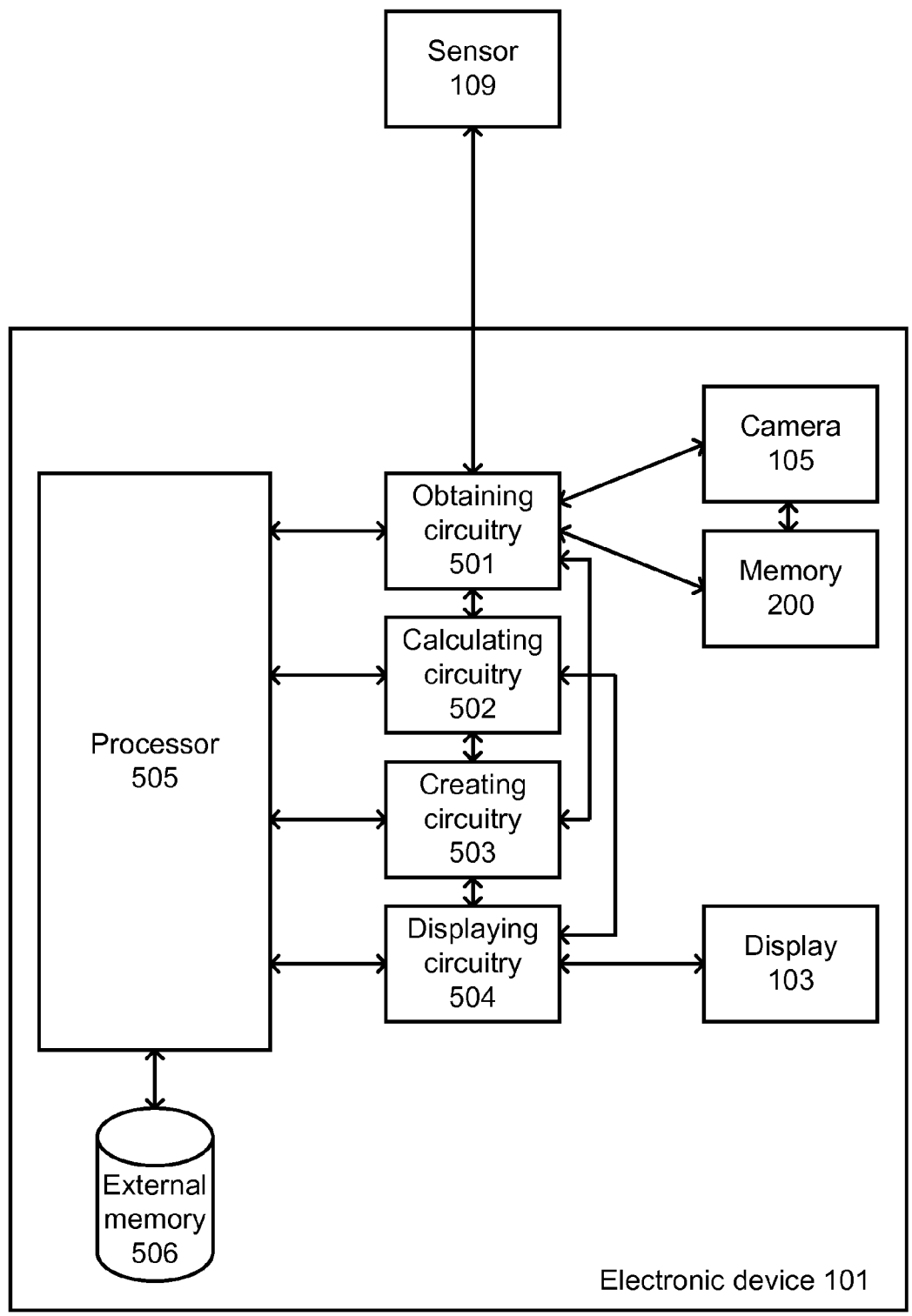
FIG. 5 is a schematic block diagram illustrating the electronic device according to some embodiments.

To perform the method actions in the electronic device 101 described above for displaying content of an obscured area 108 of a view 106 of a user 102 of the electronic device 101. The electronic device 101 comprises an arrangement depicted in FIG. 5.

In the following description, the camera 105, the memory 200 and the display 103 will be included in the electronic device 101. It is obvious for the skilled person that these units may be realized as separate units connected to the electronic device 101.

The electronic device 101 is adapted to display a content of the obscured area 108 of the view 106 of the user 102 of the electronic device 101. The content is displayed on the display 103 comprised in the electronic device 101. The display 103 is adapted to be located between the eye 104 of the user 102 and the view 106. The electronic device 101 further comprises the memory 200 connected to the camera 105 arranged on the electronic device 101.

The electronic device 101 may be an augmented reality unit.

The electronic device 101 comprises an obtaining circuitry 501 configured to obtain an information identifying the position of the obscured area 108 in relation to the view 106. The obtaining circuitry 501 is connectable to the sensor 109, camera 105 and to the memory 200.

The information identifying the position of the obscured area 108 in relation to the view 106 may comprise image data. The obtaining circuitry 501 is further configured to identify in the image data the object 107 that obscures the view 106.

The obtaining circuitry 501 may further be configured to obtain position information regarding the object 107 from the sensor 109 attached to the object 107 obscuring the view 106.

The electronic device 101 further comprises a calculating circuitry 502 configured to calculate the information identifying the position of the obscured area 108 on the display 103, based on the obtained information identifying the position of the obscured area 108 in relation to the view 106. The calculating circuitry 502 is connectable to the obtaining circuitry 501.

The obtaining circuitry 501 is further configured to obtain the information regarding the content of the view 106 or part of the view 106 when not obscured, from the memory 200.

The information regarding the content of the view 106 was recorded by the camera 105 and saved on the memory 200 before the view 106 was obscured.

The electronic device 101 further comprises a creating circuitry 503 configured to create the image relating to the content of the obscured area 108 of the view 106 based on the obtained information identifying the position of the obscured area 108 in relation to the display 103 and based on the calculated information identifying a position of the obscured area 108 in relation to the view 106, and based on the obtained information regarding the content of the view 106 or part of the view 106 when not obscured. The creating circuitry 503 is connectable to the obtaining circuitry 501 and the calculating circuitry 502.

The electronic device 101 further comprises a displaying circuitry 504 configured to display the image on a place on the display 103 that corresponds to the calculated position of the obscured area in relation to the display 103. The displaying circuitry 504 is connectable to the calculating circuitry 502, the creating circuitry 503 and the display 103.

The embodiments herein for displaying content of an obscured area 108 in the electronic device 101 may be implemented through one or more processors, such as a processor 505 in the electronic device 101, together with computer program code for performing the functions and actions of the embodiments herein. The program code mentioned above may also be provided as a computer program product, for instance in the form of a data carrier carrying computer program code for performing the embodiments herein when being loaded into the electronic device 101. One such carrier may be in the form of a CD ROM disc. It is however feasible with other data carriers such as a memory stick. The computer program code may furthermore be provided as pure program code on a server and downloaded to the electronic device 101.

The electronic device 101 may further comprise an external memory 506 comprising one or more memory units. The external memory 506 is arranged to be used to store data, received data streams, received information, configurations, schedulings, and applications to perform the methods herein when being executed in the electronic device 101.

Those skilled in the art will also appreciate that the obtaining circuitry 501, the calculating circuitry 502, the creating circuitry 503 and the displaying circuitry 504 described above may refer to a combination of analog and digital circuits, and/or one or more processors configured with software and/or firmware, e.g. stored in a memory, that when executed by the one or more processors. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above-described preferred embodiments. Various alternatives, modifications and equivalents may be used. Therefore, the embodiments should not be taken as limiting the scope of the invention, which is defined by the appending claims.

The invention claimed is:

1. A method in an electronic device for displaying content of an obscured area of a view of a user of the electronic device, which content is displayed on a display comprised in the electronic device, which display is adapted to be located between an eye of the user and the view, the electronic device further comprises a memory connected to a camera, the camera being arranged on the electronic device, the method comprising:

obtaining an information identifying a position of the obscured area in relation to the view, calculating an information identifying the position of the obscured area on the display, based on the obtained information identifying the position of the obscured area in relation to the view, obtaining an information regarding the content of the view or part of the view when not obscured from the memory, wherein the information regarding the content of the view was recorded by the camera and saved on the memory before the view was obscured, creating an image relating to the content of the obscured area of the view based on the obtained information identifying the position of the obscured area in relation to the display and based on the calculated information identifying a position of the obscured area in relation to the view, and based on the obtained information regarding the content of the view or part of the view when not obscured, and displaying the image on a place on the display that corresponds to the calculated position of the obscured area in relation to the display.

2. The method according to claim 1, wherein the information identifying the position of the obscured area in relation to the view comprises image data, and wherein the obtaining the information identifying a position of the obscured area in relation to the view further comprises identifying in the image data an object that obscures the view.

3. The method according to claim 1, wherein obtaining the information identifying a position of the obscured area in relation to the view further comprises:
obtaining, from a sensor attached to an object obscuring the view, position information regarding the object.

4. The method according to claim 1, wherein the electronic device is an augmented reality unit.

5. An electronic device for displaying a content of an obscured area of a view of a user of the electronic device, which content is displayed on a display comprised in the electronic device, which display is adapted to be located between an eye of the user and the view, the electronic device, the electronic device further comprises a memory connected to a camera, the camera being arranged on the electronic device, the electronic device comprises:
an obtaining circuitry configured to obtain an information identifying a position of the obscured area in relation to the view,
a calculating circuitry configured to calculate an information identifying the position of the obscured area on the display, based on the obtained information identifying the position of the obscured area in relation to the view, and
wherein the obtaining circuitry is further configured to obtain an information regarding the content of the view or part of the view when not obscured from the memory, wherein the information regarding the content of the view was recorded by the camera and saved on the memory before the view was obscured,
a creating circuitry configured to create an image relating to the content of the obscured area of the view based on the obtained information identifying the position of the obscured area in relation to the display and based on the calculated information identifying a position of the obscured area in relation to the view, and the obtained information regarding the content of the view or part of the view when not obscured, and
a displaying circuitry configured to display the image on a place on the display that corresponds to the calculated position of the obscured area in relation to the display.

6. The electronic device according to claim 5, wherein the information identifying the position of the obscured area in relation to the view comprises image data, and wherein the obtaining circuitry further is configured to identify in the image data an object that obscures the view.

7. The electronic device according to claim 5, wherein the obtaining circuitry further is configured to obtain from a sensor attached to an object obscuring the view, position information regarding the object.

8. The electronic device according to claim 5, wherein the electronic device is an augmented reality unit.

9. A non-transitory computer-readable medium having stored thereon sequences of instructions which, when executed by at least one processor, cause the at least one processor to:
obtain information identifying a position of an obscured area of a view of a user of an electronic device in relation to the view,
calculate information identifying the position of the obscured area on a display of the electronic device, based on the obtained information identifying the position of the obscured area—in relation to the view,
obtain, from a memory associated with the electronic device, information regarding the content of at least part of the view when not obscured, wherein the information regarding the content of at least part of the view was recorded by a camera associated with the electronic device and saved on the memory before the view was obscured,
create an image relating to the content of the obscured area of the view based on the obtained information identifying the position of the obscured area in relation to the view and based on the calculated information identifying the position of the obscured area in relation to the view, and based on the obtained information regarding the content of at least part of the view when not obscured, and
display the image on a place on the display that corresponds to the calculated position of the obscured area in relation to the view.

* * * * *